United States Patent
Smith et al.

(10) Patent No.: US 9,985,946 B2
(45) Date of Patent: May 29, 2018

(54) SYSTEM, APPARATUS AND METHOD FOR SAFETY STATE MANAGEMENT OF INTERNET THINGS (IOT) DEVICES

(71) Applicant: Intel Corporation, Santa Clara, CA (US)

(72) Inventors: Ned M. Smith, Beaverton, OR (US); Rajesh Poornachandran, Portland, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 14/977,742

(22) Filed: Dec. 22, 2015

(65) Prior Publication Data
US 2017/0180340 A1 Jun. 22, 2017

(51) Int. Cl.
*H04L 29/06* (2006.01)
*H04L 9/32* (2006.01)
*H04L 9/08* (2006.01)

(52) U.S. Cl.
CPC ............ *H04L 63/08* (2013.01); *H04L 9/0847* (2013.01); *H04L 9/3255* (2013.01); *H04L 63/0853* (2013.01)

(58) Field of Classification Search
CPC ... H04L 63/08; H04L 63/0853; H04L 9/0847; H04L 9/3244; H04L 9/3255; H04L 12/06659
See application file for complete search history.

(56) References Cited

U.S. PATENT DOCUMENTS

| | | | | |
|---|---|---|---|---|
| 5,113,507 A | * | 5/1992 | Jaeckel | G06N 99/005 711/5 |
| 8,468,361 B2 | * | 6/2013 | Buer | H04L 63/0428 713/168 |

(Continued)

FOREIGN PATENT DOCUMENTS

WO 2015099661 7/2015

OTHER PUBLICATIONS

International Searching Authority, "Notification of Transmittal of the International Search Report and the Written Opinion of the International Searching Authority," dated May 15, 2017, in International application No. PCT/US2016/064266.

(Continued)

*Primary Examiner* — Eleni A Shiferaw
*Assistant Examiner* — Sher A Khan
(74) *Attorney, Agent, or Firm* — Top, Pruner & Hu, P.C.

(57) ABSTRACT

In one embodiment, a device includes: at least one processor; at least one sensor to sense an environmental condition; and a storage to store instructions that, when executed by the at least one processor, enable the device to: receive an encrypted nonce from a safety controller; decrypt the encrypted nonce using a value obtained from an entropy multiplexing seed tree generated by the device based at least in part on an initialization seed value received from the safety controller; responsive to decryption of the nonce, update a portion of a shared memory associated with the device to identify a safety state of the device; and encrypt a second nonce using the value obtained from the entropy multiplexing seed tree and send the encrypted second nonce to the safety controller. Other embodiments are described and claimed.

8 Claims, 9 Drawing Sheets

(56) References Cited

U.S. PATENT DOCUMENTS

| | | | |
|---|---|---|---|
| 8,686,924 B2 | 4/2014 | Braun et al. | |
| 9,860,057 B2* | 1/2018 | Smith | H04L 9/0841 |
| 2001/0023482 A1* | 9/2001 | Wray | H04L 63/0281 |
| | | | 713/151 |
| 2002/0076049 A1* | 6/2002 | Boykin | H04N 7/1675 |
| | | | 380/211 |
| 2002/0080960 A1* | 6/2002 | Kanayama | G11B 20/00086 |
| | | | 380/201 |
| 2003/0044017 A1* | 3/2003 | Briscoe | H04L 9/0836 |
| | | | 380/277 |
| 2003/0212511 A1* | 11/2003 | Carle | G01H 1/003 |
| | | | 702/56 |
| 2004/0158376 A1* | 8/2004 | Knueppel | B60R 21/013 |
| | | | 701/45 |
| 2005/0166263 A1* | 7/2005 | Nanopoulos | G06F 21/31 |
| | | | 726/7 |
| 2006/0248336 A1* | 11/2006 | Bruns | H04L 9/0822 |
| | | | 713/171 |
| 2008/0052384 A1 | 2/2008 | Marl et al. | |
| 2009/0016307 A1* | 1/2009 | Okada | H04W 8/005 |
| | | | 370/338 |
| 2010/0262664 A1 | 10/2010 | Brown et al. | |
| 2013/0103942 A1* | 4/2013 | Sullivan | H04L 9/0662 |
| | | | 713/168 |
| 2013/0262880 A1* | 10/2013 | Pong | G06F 12/1441 |
| | | | 713/193 |
| 2014/0002647 A1* | 1/2014 | Xu | H04N 7/18 |
| | | | 348/143 |
| 2015/0281392 A1 | 10/2015 | Kim et al. | |
| 2015/0310219 A1* | 10/2015 | Haager | G06F 21/602 |
| | | | 713/165 |
| 2015/0351068 A1* | 12/2015 | Deleeuw | H04W 64/00 |
| | | | 455/456.1 |
| 2016/0012252 A1* | 1/2016 | Deleeuw | G06F 21/6254 |
| | | | 726/26 |

OTHER PUBLICATIONS

Wikipedia, "OSI Model", https://en.wikipedia.org/wiki/OSI_model#Layer 4:_Transport_Layer, Jun. 8, 2015, 7 pages.

Wikipedia, "Key Management", https://en.wikipedia.org/wiki/Key_management, May 19, 2015, 5 pages.

Wikipedia, "Publish-Subscribe Pattern", https://en.wikipedia.org/wiki/Publish%E2%80%93subscribe_pattern, Mar. 18, 2015, 4 pages.

Wikipedia, "Data Distribution Service", https://en.wikipedia.org/wiki/Data_Distribution_Service, May 21, 2015, 5 pages.

Wikipedia, "Kerberos (Protocol)", https://en.wikipedia.org/wiki/Kerberos_%28protocol%29, May 7, 2015, 6 pages.

Stackexchange, "Cryptography", http://crypto.stackexchange.com/questions/3682/how-can-the-diffie-hellman-key-exchange-be-extended-to-three-parties, Aug. 30, 2012, 1 page.

Wikipedia, "XMPP", https://en.wikipedia.org/wikiXMPP, May 22, 2015, 7 pages.

IBM Mobilefirst, "Pairwise and Group Keys", http://etutorials.org/Networking/802.11+security.+wi-fi+protected+access+and+802.11i/Part+II+The+Design+of+Wi-Fi+Security/Chapter+10.+WPA+and+RSN+Key+Hierarchy/Pairwise+and+Group+Keys/, accessed Sep. 3, 2015, 6 pages.

Hardjono, et al., "Fluffy: Simplified Key Exchange for Constrained Environments", draft-hardjono-ace-fluffy-00, Mar. 23, 2015, 24 pages, Intel Corporation.

Openinterconnect.org, "Open Interconnect Consortium: An Overview to Connect Devices Everywhere", http://openinterconnect.org/wp-content/uploads/2015/07/Open-Interconnect-ConsortiumOverview_Final-.pdf, Jul. 2015, 7 pages.

Openinterconnect.org, "The Open Interconnect Consortium and IoTivity", http://openinterconnect.org/wp-content/uploads/2015/07/OIC-IoTivity_White-Paper_Final1.pdf, Jul. 2015, 5 pages.

Openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.

Openinterconnect.org, "Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.

U.S. Appl. No. 14/863,043, filed Sep. 23, 2015, entitled "System, Apparatus and Method for Group Key Distribution on for a Network" by Ned M. Smith.

U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.

U.S. Appl. No. 14/864,957, filed Sep. 25, 2015, entitled "System, Apparatus and Method for Managing Lifecycle of Secure Publish-Subscribe System" by Ned M. Smith, et al.

U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.

U.S. Appl. No. 14/865,191, filed Sep. 25, 2015, entitled "System, Apparatus and Method for Multi-Owner Transfer of Ownership of a Device" by Jesse Walker, et al.

U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.

U.S. Appl. No. 14/856,857, filed Sep. 17, 2015, entitled "System, Apparatus and Method for Access Control List Processing in a Constrained Environment" by Ned M. Smith, et al.

U.S. Appl. No. 14/859,572, filed Sep. 21, 2015, entitled "System, Apparatus and Method for Privacy Preserving Distributed Attestation for Devices" by Ned M. Smith, et al.

U.S. Appl. No. 14/863,496, filed Sep. 24, 2015, entitled "System, Apparatus and Method for Stateful Application of Control Data in a Device" by Nathan Heldt-Sheller, et al.

U.S. Appl. No. 14/998,275, filed Dec. 26, 2015, entitled "System, Apparatus and Method for Auto-Optimization of Access Control Policy and Key Management in a Network Authoring Tool" by Ned M. Smith, et al.

U.S. Appl. No. 15/045,676, filed Feb. 17, 2016, entitled "System, Apparatus and Method for Security Interoperability Path Analysis in an Internet of Things (IOT) Network" by Ned M. Smith, et al.

U.S. Appl. No. 62/172,962, filed Jun. 9, 2015, entitled "Providing Protected Content in an IoT Network" by Ned M. Smith, et al.

U.S. Appl. No. 14/968,125, filed Dec. 14, 2015, entitled "A Self-Configuring Key Management System for an Internet of Things Network" by Ned M. Smith.

U.S. Appl. No. 14/757,750, filed Dec. 23, 2015, entitled "System, Apparatus and Method for Optimizing Symmetric Key Cache Using Tickets Issued by a Certificate Status Check Service Provider" by Ned M. Smith, et al.

U.S. Appl. No. 14/976,165, filed Dec. 21, 2015, entitled "System, Apparatus and Method for Migrating a Device Having a Platform Group" by Ned M. Smith, et al.

Wikipedia, "Tor", https://en.wikipedia.org/wiki/Tor_%28anonymity_network%29 , Jun. 4, 2015, 14 pages.

Networkworld, "A guide to the confusing Internet of Things standards world", http://www.networkworld.com/article/2456421/internet-of-things/a-guide-to-the-confusing-internet-of-things-standards-world.html, Jul. 21, 2014, 7 pages.

Wikipedia.org, "Fountain Code," downloaded Nov. 18, 2015, 3 pages.

* cited by examiner

SYSTEM, APPARATUS AND METHOD FOR SAFETY STATE MANAGEMENT OF INTERNET THINGS (IOT) DEVICES

BACKGROUND

Constrained Internet of Things (IoT) devices across an IoT group may have to transition from a safe operational state to a safety critical operational state on detection of critical sensor assertions. For example, a smoke alarm can monitor smoke to detect a potential fire. If detected, a security controller that receives a report from the smoke alarm calls for action for IoT devices in a given location to transition to an emergency response state. This may include action to notify all door/window IoT devices to transition to an unlock mode. This operation may require IoTs to be overridden by safety controllers to a new state based on policy configuration. Compute complexity, latency, and security considerations all weigh on such operation.

DETAILED DESCRIPTION

In various embodiments, a device such as an IoT device may leverage digital random number generation and Advanced Encryption Standard new instructions (AESNI) technologies combined with Entropy Multiplexing (EM), such as may be available in Intel® Architecture-based processors or other processors, to synchronize secure state transitions for a collection of IoT devices with fine granularity state control using a transactional memory arrangement. In one embodiment, a distributed shared memory resource may be used to track device states for a collection of IoT devices. In particular, transitions from a normal status to a safety critical status (and vice versa) among other states, can be tracked. The shared memory region may be configured as a sparse storage having a large addressable range, but may populate only a few memory segments of the addressable range.

Figure 1:
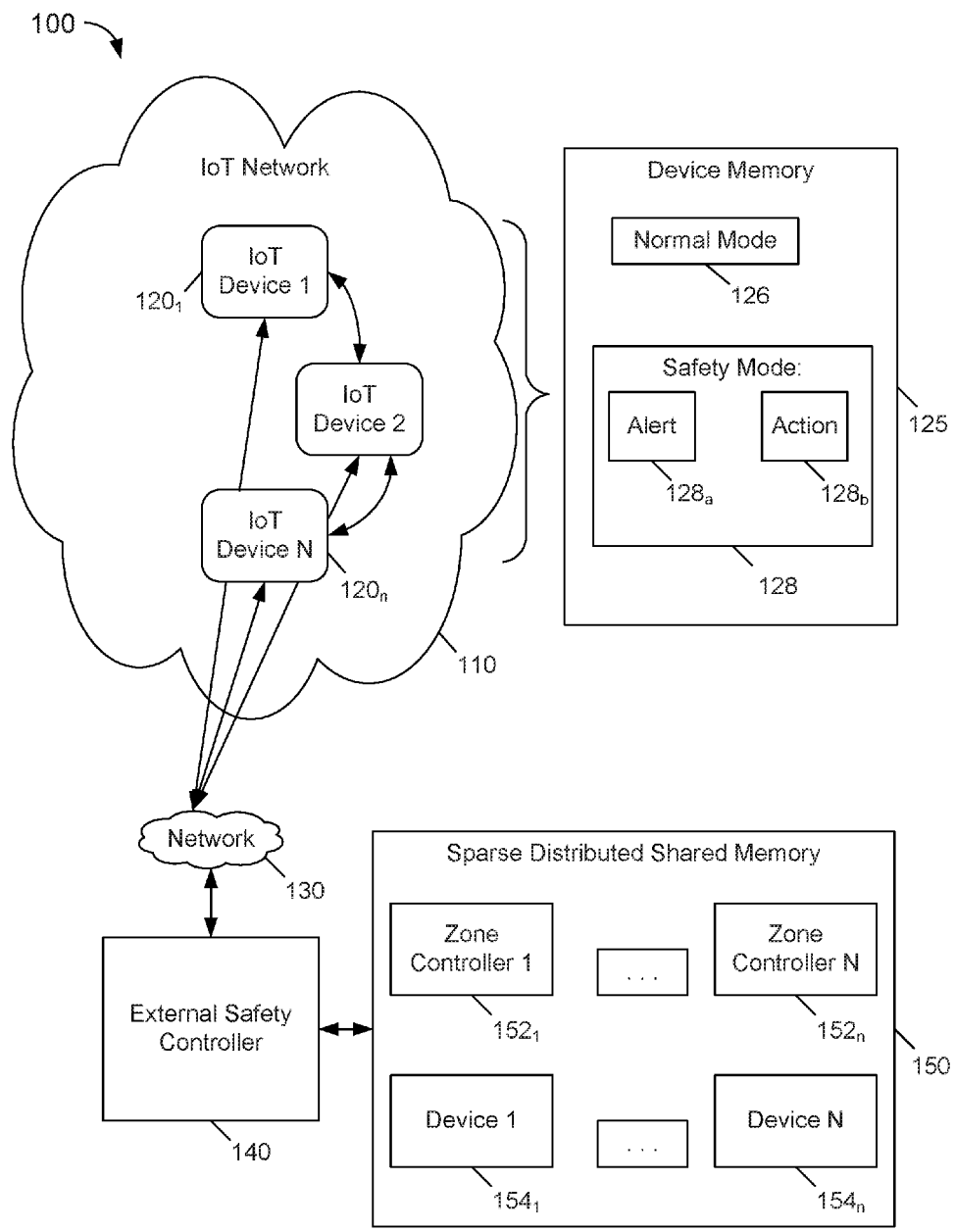
FIG. 1 is a block diagram of a system in accordance with an embodiment of the present invention.

Referring now to FIG. 1, shown is a block diagram of a system in accordance with an embodiment of the present invention. As shown in FIG. 1, system 100 may be an architecture of a network of IoT and other devices. This network may be present in a single location, such as an industrial location, corporate entity or so forth. In other cases, the network may be distributed over a local area or wide area such that different portions of the network may be located physically disparate from each other.

Regardless of the type of network and device types within the network, understand that for purposes described herein, at least certain computing devices such as various IoT devices within the network are safety-conscious, in that they can operate in a safety state, which may be a special mode of operation to provide for safety-related features or actions that may be performed when a safety issue, such as fire, intrusion, attack, or other safety-related concern, is identified.

As illustrated in FIG. 1, system 100 includes an IoT network 110. IoT network 110 may include a plurality of IoT devices $120_1$-$120_2$. In different implementations, the IoT devices may be a mix of different types of such devices, while in other cases the IoT devices may be homogeneous devices. As examples, at least some of IoT devices 120 may have multiple functionality, including actuator functionality, sensor functionality, and controller functionality. This triad of functions can enable a given device to take certain actions based on sensed information. With particular reference to safety issues, responsive to a sensor indication, a safety action such as an opening or closing of an actuator of a given IoT device may occur. Of course many other examples are possible.

Understand that IoT devices 120 may include at least minimal computing capabilities. As such, such IoT devices may include one or more processors such as an SoC or other processing logic, one or more non-transitory memories and/or storage, as well as potentially other components such as actuators, sensors, network interfaces, and so forth. In at least some embodiments, a given processor or SoC (or portion thereof) may include separate secure circuitry (or may be configured to operate in a secure mode). Such secure mode provides a trusted execution environment (TEE) for the device. In example embodiments, a TEE of the device may leverage Intel® Software Guard Extensions (SGX), Intel® MemCore, Intel® Converged Security Engine (CSE), Intel® virtualization technology (VT-X), Intel® IOT-OS with Smack, ARM TrustZone, among other secure environments.

With reference to safety information, each IoT device 120 may include or be associated with a device memory 125, which corresponds to a local memory of the device such as a given volatile and/or non-volatile storage device. Such device memory may store various information for use by the device. In some cases, device memory 125 can be partitioned into a normal mode partition 126 and a safety mode partition 128. Each partition may be configured to store various information. With reference to safety mode partition 128, device state information and corresponding actions to be taken may be stored. In the embodiment shown, partition 128 may include a first field 128a for storage of alert information and a second field 128b for storage of action information. As such, e.g., responsive to a safety alert status identified by an indicator stored in field 128a, a given IoT device (including or associated with the device memory) may take the action in field 128b. In some cases, these fields each may be divided into partitions: a device partition in which a device updates this region and the current configured action it took and the status of the action; and a safety controller partition in which the safety controller can read the device's action taken for a specific alert and update the policy for next steps/future alerts. Of course understand that additional fields and other information may be stored in device memory 125.

Still referring to FIG. 1, IoT network 110 couples via another network 130, e.g., the Internet, to an external safety controller 140. In various embodiments, safety controller 140 may be one or more such safety controllers that can be configured as a master controller to orchestrate safety operations for devices within IoT network 110. As one example, safety controller 140 may be implemented as one or more servers. Although such servers may be present in a remote location with respect to IoT network 110, understand the scope of the present invention is not limited in this regard, and in other cases safety controller 140 may be co-located within IoT network 110.

Understand further that while not shown for ease of illustration, it is possible for there to be a hierarchical architecture of safety controllers in network 100 such that different levels of safety controllers are present. In such case, local safety controllers may be associated with (or included within) particular IoT devices while in turn additional hierarchy levels of safety controllers may exist between IoT devices 120 and safety controller 140.

Still referring to FIG. 1, safety controller 140 may be configured to manage a shared memory structure 150. Shared memory 150 may be a sparse array in which safety-related information regarding various IoT devices and safety controllers can be stored. In different embodiments, shared memory 150 may be a distributed memory. Understand that memory 150 may be present in different locations in particular embodiments. For examples, in one case shared memory 150 may be present within IoT network 110. In other cases, shared memory 150 may be co-located with safety controller 140. In yet other cases, different portions of shared memory 150 may be distributed throughout system 100.

In different implementations, a size of shared memory 150 may depend on the IoT network size and capability. In one example, shared memory 150 may be 100 s of gigabytes (GB) for a miniature network to several thousands of terabytes (TBs) for a large network. Sparseness can be tuned based on collisions detected as a feedback mechanism. Note that for access to this shared memory, a logical/virtual memory address can be constructed using a deviceID (e.g., a universal unique identifier (UUID) of 128-bits, or an IPV6 network address also of 128-bits) swizzled to a memory segment that is aligned to the memory architecture of the physical device. For example, if the physical device has 8-bit addressable memory (256-bytes), then a virtual address of 136-bits (128+8) is its IoT safety controller shared memory address. If there were 10 physical devices visible to the safety controller, then the actual shared memory space would be 2560 bytes (10*256). But the sparse array size would be $2^{136}$ bytes.

In embodiments, safety controller 140 may be configured to efficiently manage state transitions of IoT devices 120 using sparse transactional memory 150 and an EM technique. This shared address space accessed with entropy multiplexing seed values may provide significant scalability, as each IoT device memory can be mapped (virtual/physical) to a unique region in memory 150 with direct accessibility. Entropy multiplexing also may be used for key derivation that devices can derive in a distributed independent manner. An EM-generated safety seed tree can be used to manage safety states for IoT devices 120.

EM also allows IoT devices 120 to perform key derivation in a distributed independent manner that can be verified by safety controller 140. As such, embodiments can uniquely create device, zone, domain, (etc.)—level transactional memory access control, which may avoid any race condition, since devices 120 are restricted to access only specific portions of memory 150. As a result, constrained devices 120 do not have to be in a busy loop or sleep for locks, especially during critical safety state handling.

As seen, shared memory 150 includes a first plurality of storage locations $152_1$-$152_n$, each associated with a given zone controller, which may be present with particular regions of IoT network 100, each associated with one or more IoT devices 120, and which may aggregate safety-related information for one or more IoT devices. Storage locations 152 may store safety-related information associated with corresponding zone controllers. In an embodiment, such information may be obtained and stored in shared memory 150 responsive to report information received from the zone controllers. Storage locations 154 may store safety-related information associated with corresponding IoT devices. In an embodiment, such information may be obtained and stored in shared memory 150 responsive to report information received from the devices.

IoT devices 120 may be configured to use an efficient method for synchronizing the shared memory resource with local memory. In an embodiment this synchronization efficiency is achieved in part by pre-determining virtual memory address ranges and security keys using an EM seed tree. Subsequent to an initialization seed value that is securely shared with participating devices, each device knows how to derive the same seed tree. The tree encodes both time and memory segmentation scheme of the sparse shared memory resource. The time-based encoding is used when deriving symmetric keys used to encrypt state synchronization messages. A new key may be derived on a selected time basis, such as every day, hour, minute, or so forth depending on implementation.

Since both the device and safety controller share the same tree, they can agree on a seed to use to derive the next key. This solution assumes the devices have access to wall clock time and that clocks are accurate within a predetermined value determined by policy. Use of the seed tree enables high levels of security without use of more complex cryptography, key management, key provisioning, etc., and without sending sensitive data in clear form.

In one embodiment, virtual memory addressing in sparse memory 150 can be computed as follows. First a device 120 determines the desired properties of the shared memory resource, which may include metadata or parameters such as word size (e.g., 32, 64, 128-bit), segment size, page size and virtual memory size. In an embodiment, safety controller 140 supports a variety of choices. Then a unique identifier of device 120 (e.g., a universally unique identifier (UUID)) may be used to compute the device's offset into the sparse virtual memory image. In one embodiment, this computation may be performed by using a pseudo-random function (PRF) with the device's UUID as input and a random value from the EM tree. In an embodiment, the random value may be large, e.g., 512-bits or more, which determines the sparseness of the shared memory 150 (e.g., Address-Offset-Device-1=PRF(512-bit-random value, DeviceID).

Understand that the time encoded into the EM tree is used to find an appropriate encryption key that is then used to encrypt the data value along with the shared memory addressing scheme selected by the device. Note that different devices can choose different addressing schemes. The EM tree may also be used to encode a variety of schemes to optimize space needed to make a scheme selection (e.g., {data, memory scheme, nonce, deviceID}$_{Kem-day}$, where $_{Kem-day}$ is a key obtained from the tree for a particular time period (e.g., a given day)). Note that devices may obtain device unique keys by seeding the EM tree with the safety controller seed and the UUID (e.g., $seed_{SC}$+deviceID).

Thus safety controller 140 maintains shared memory resource 150 and IoT devices 120 use an efficient method of synchronizing the shared memory resource with local memories. In an embodiment, distributed shared memory resource 150 is used to track device states for a collection of IoT devices 120. In particular, states that transition from a normal operational status to a safety critical status are tracked. Understand while shown at this high level in the embodiment of FIG. 1, many variations and alternatives are possible.

Figure 2:
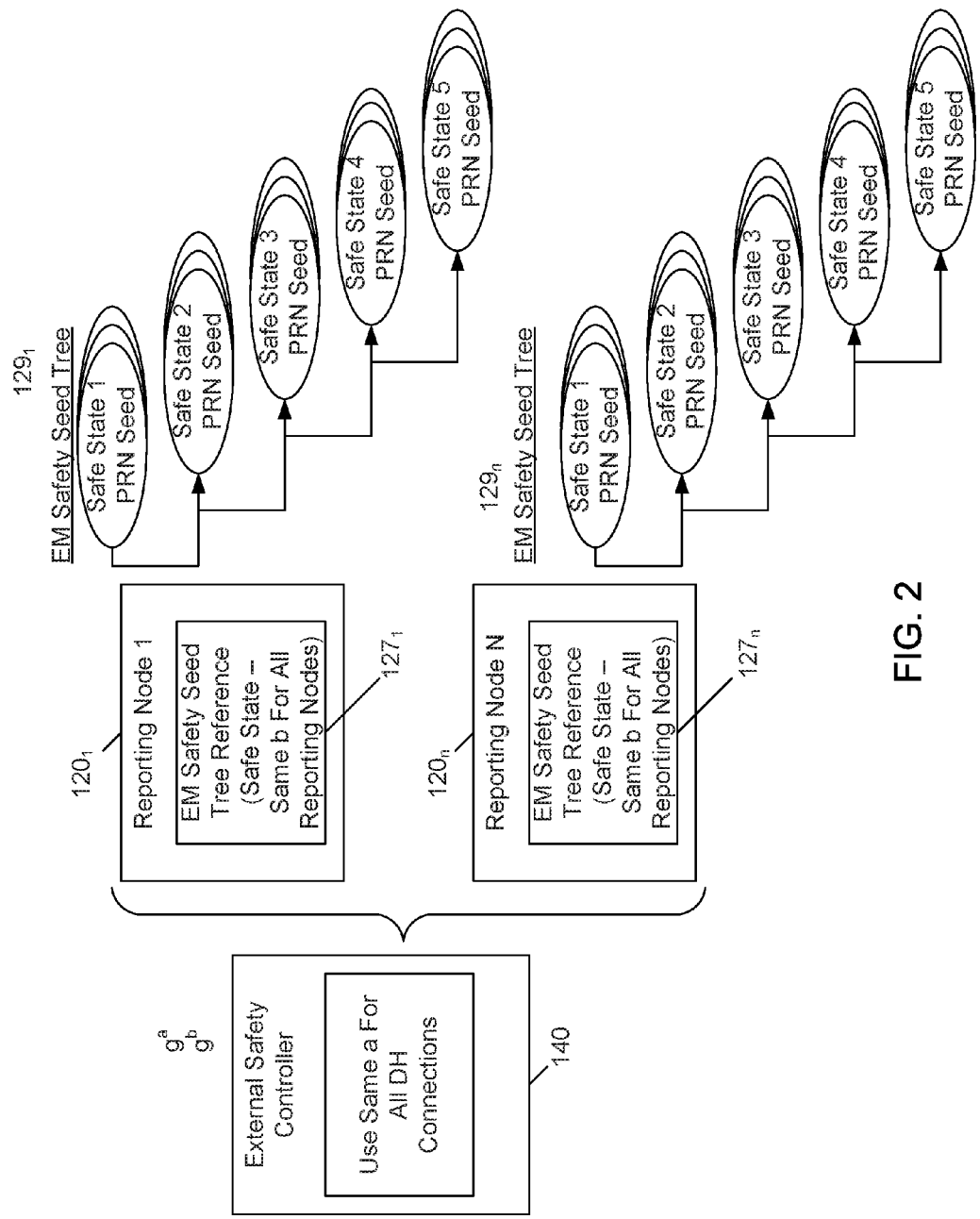
FIG. 2 is a block diagram of a plurality of reporting nodes participating in an M of N threshold scheme using entropy multiplexing in accordance with an embodiment.

Referring now to FIG. 2, shown is a block diagram of a plurality of reporting nodes $120_1$-$120_n$ (each an IoT device) participating in an M of N threshold scheme using entropy multiplexing in accordance with an embodiment. Each node 120 includes a digital random number generator 127, which may be implemented as combinations of hardware circuitry, software and/or firmware, that may be used to generate a seed tree based on a given seed value.

Safety controller 140 is concerned that a man in the middle (MITM) attacker might compromise the reporting nodes and provide rogue safety records. Embodiments may counter this threat by enabling all reporting nodes to attest using the same Diffie-Hellman (DH) $g^a$ value. Entropy multiplexing (EM) provides a method for multiple nodes to agree on a random value, while still allowing selection of new (temporal) random numbers frequently. Note that a seed value, which may be generated using random number generator 127 such as an Intel® Digital Random Number Generator, may be used in turn to generate, e.g., using pseudo random number generation (PRNG), a hierarchy of pseudo-random number generator seeds that multiple reporting nodes may use to produce the same DH random value when attesting to the external verifier (for a given safety record).

More specifically, each reporting node may generate an EM seed tree $129_1$-$129_n$. As seen, each seed tree 129 (also referred to as an EM safety seed tree) provides a hierarchy in which PRN seeds are generated according to a defined schedule. Seed tree 129 encodes both the time and memory segmentation scheme of the sparse shared memory resource. Note that embodiments may implement EM or Seed Tree Encoding using Entropy Multiplexing (STEEM)-related operations by providing for random number generation within a trusted execution environment to enable safety-related operations as described herein. This is accomplished by use of pseudo random number generators and distribution of random number seeds among various entities. As detailed below, in particular embodiments the level of access control may be controlled by time bounding in which a hierarchy of random number seeds are managed to allocate access over different time periods. As used herein, the term "random number" may refer to a true random number or a pseudo random number depending upon context, and absent an explicit indication, may refer to either a true random number or pseudo random number.

IoT devices 120 (and safety controller 140) may comprise various hardware elements, software elements, or a combination of both to realize an entropy multiplexer. Examples of hardware elements may include devices, components, processors, microprocessors, circuits, circuit elements, integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Note that safety controller 140 may generate a true random number as an initialization seed value from which a random number sequence can be generated in IoT devices 120. More specifically, IoT devices 120 may provide this initialization seed value to a PRNG to generate (and regenerate) a pseudo random number (PRN) sequence, at least some of which may be used as random values used as described herein. Over time, IoT devices 120 may periodically generate these random numbers. For example, a PRNG may generate periodically a set of safety seed PRNs for a particular time quantum (e.g., one second as an example).

Each PRN of a sequence of PRNs is generated based upon a procedure or algorithm implemented by the PRNG. Each successive PRN is generated by operation of the algorithm on the previous PRN. In order for a trusted party to regenerate a given PRN in a sequence generated by the PRNG, in addition to the actual algorithm employed by the PRNG, the party may be provided with a seed used to initialize the PRNG, as well as the number of steps taken to reach the given PRN from the PRNG. Thus, a PRN that is derived from a given PRN may be regenerated by any party or entity that employs a pseudo random number generator using the given algorithm and having the given PRN as input.

As illustrated, the safety seed tree structure is such that a random number seed generated for a given level is operative to seed one or more random number sequences at levels below the given level. This may result in generation of multiple parallel random number sequences populated as the random number generation extends to lower levels in which each given random number of a random number sequence received from a higher level may feed a separate PRNG at a level below. Each separate PRNG, in turn, may generate a new random number sequence in which each random number feeds a corresponding PRNG on a lower level.

Of course understand that more levels of a hierarchy may be present. In embodiments, each reporting node 120 may, according to a given schedule, use the same b value used to generate a DH $g^b$ value. Safety controller 140 performs an attestation with each reporting node verifying that each supplies the same $g^a$ value. When a threshold of M values is reached, the safety controller concludes that the safety record has not been compromised because the probability of M of N successful MITM attacks is very low.

The entropy multiplexing scheme of FIG. 2 enables pre-determining the virtual memory address space for each IoT device 120, and security keys for communication. Via EM, multiple nodes can agree on a random value while still allowing selection of new (temporal) random numbers frequently.

As shown in FIG. 2, EM establishes a hierarchy of pseudo-random number generator seeds 129 that multiple reporting nodes may use to produce the same DH random value when attesting to the external verifier (safety controller 140) (e.g., for a given safety or other telemetry record). Subsequent to an initialization seed value that is securely shared with participating devices, each device knows how to derive the same seed tree. The tree encodes both time and memory segmentation scheme of sparse shared memory resource 150.

Figure 3:
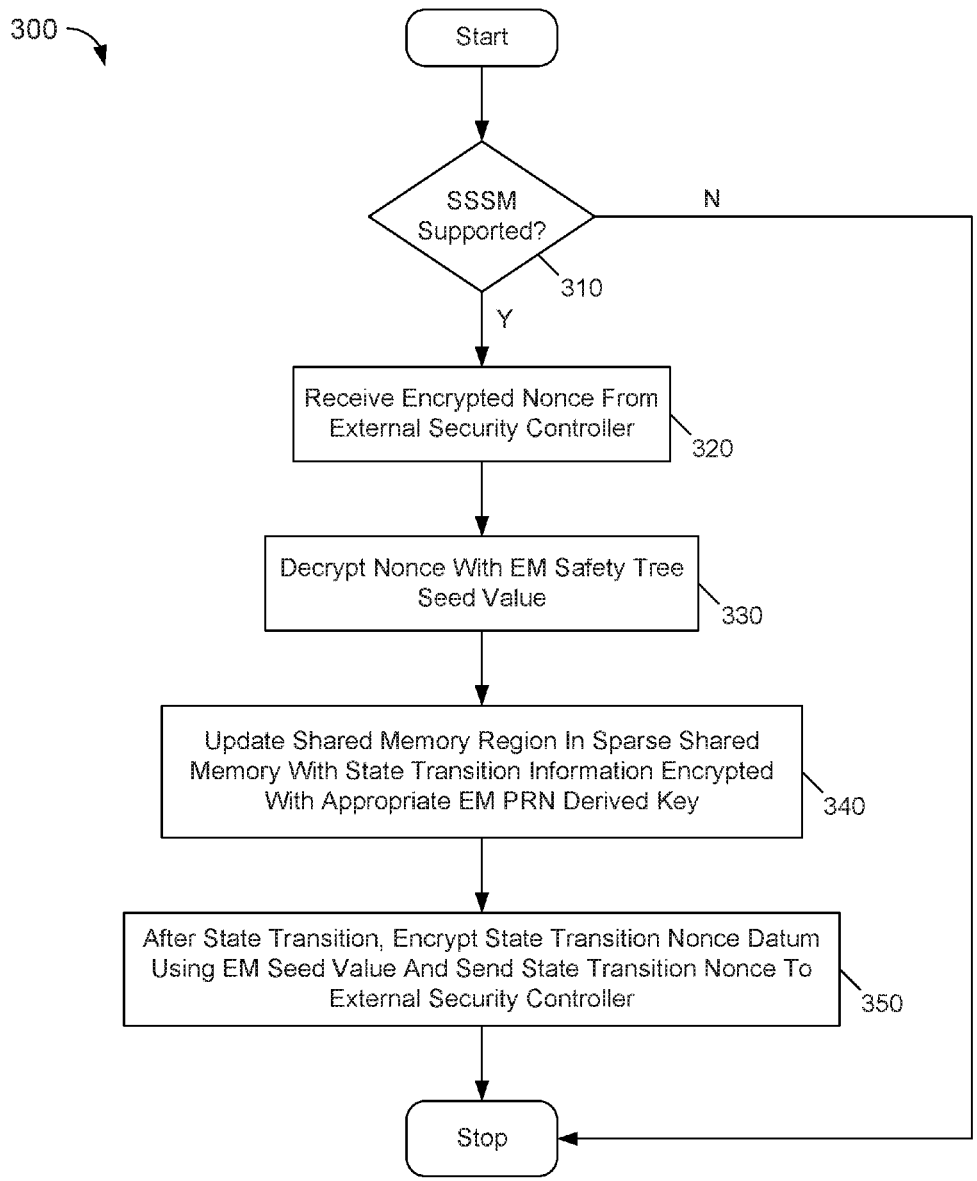
FIG. 3 is a flow diagram of a method in accordance with an embodiment of the present invention.

Referring now to FIG. 3, shown is a flow diagram of a method in accordance with an embodiment of the present invention. More specifically, method 300 shown in FIG. 3 is a method for providing reporting of safety-related information as described herein from individual nodes within an IoT network. In various embodiments, method 300 may be implemented by combinations of hardware circuitry, software, and/or firmware that execute on an IoT device. In some cases, general-purpose processing circuitry such as a general-purpose processor may be used to perform the method. In other cases, method 300 may be executed within a trusted execution environment (TEE) of the IoT device, which may be performed by separate secure circuitry or logic of the IoT device, or by a general-purpose processor executing in a secure mode such as in a given TEE.

As illustrated, method 300 begins by determining whether secure safety state management (SSSM) is enabled for the device (diamond 310). For example, some IoT devices may not be configured for such operation. In other cases, depending upon implementation of an IoT device into a particular network, safety related reporting may or may not be enabled, e.g., based on configuration information.

Assuming that such reporting is enabled, control passes to block 320 where an encrypted nonce may be received from an external security controller. In an embodiment, this external security controller may be an external safety controller such as described above with regard to FIG. 1. In an embodiment, this nonce may be encrypted using an EM value, as discussed above. As such, with reference still to FIG. 3 next at block 330, the nonce may be decrypted. More specifically, the device may use its EM safety tree and one or more seed values generated within the safety tree to decrypt the nonce. Next at block 340 the device may update a shared memory region, e.g., sparse distributed shared memory, as discussed above. More specifically, a given node may update its dedicated location within this sparse memory with its state transition information (e.g., corresponding to a particular safety state transition). In an embodiment, such update may be performed by update in local memory of the IoT device, and are (e.g., encrypted) communication to the safety controller to update the distributed shared memory.

In an embodiment, this information may be encrypted prior to its transmission from the IoT device. In one embodiment, the device may use an EM pseudo random number (PRN)-derived key to encrypt this information. Next at block 350 an encrypted state transition nonce may be sent back to the external security controller. In one embodiment a single transmission of this nonce may occur. In other cases, such as depending upon policy configuration, this nonce may be communicated at regular sampling intervals until it is acknowledged by the external security controller. Understand while shown at this high level in the embodiment of FIG. 3, many variations and alternatives are possible.

Figure 4:
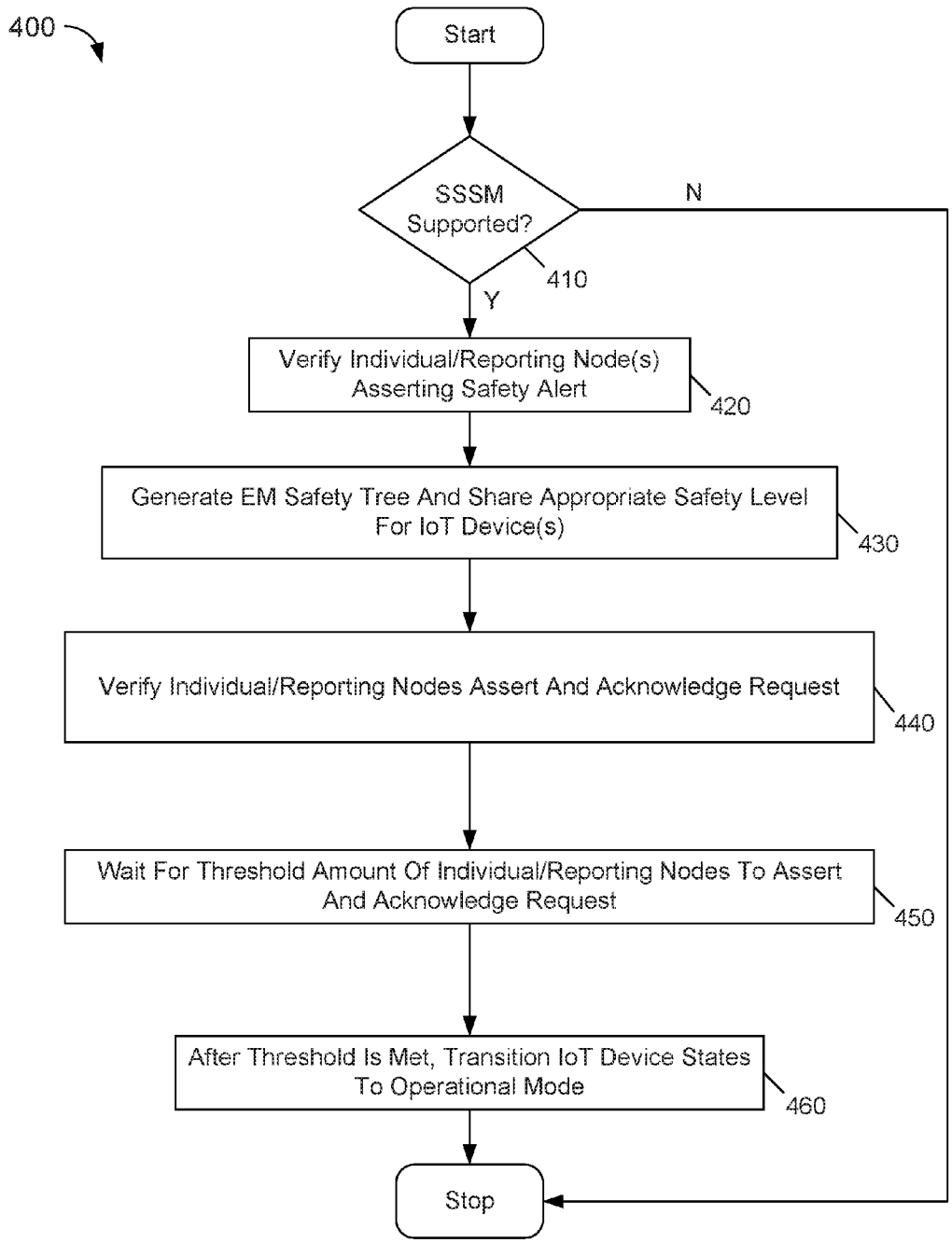
FIG. 4 is a flow diagram of a method in accordance with an embodiment of the present invention.

Referring now to FIG. 4, shown is a flow diagram of a method in accordance with an embodiment of the present invention. More specifically, method 400 shown in FIG. 4 is a method for performing operations in a safety controller as described herein. In various embodiments, method 400 may be implemented by combinations of hardware circuitry, software, and/or firmware that execute at least in part in a safety controller. In some cases, general-purpose processing circuitry such as a general-purpose processor may be used to perform the method. In other cases, method 400 may be executed within a trusted execution environment of the safety controller, which may be performed by separate secure circuitry or logic of the safety controller, or by a general-purpose processor executing in a secure mode such as in a given TEE.

As illustrated, method 400 begins by determining whether secure safety state management is enabled for the safety controller (diamond 410). Next, assuming that safety state management is supported by the safety controller, control passes to block 420 where individual/reporting nodes that are asserting a safety alert may be verified. Depending upon implementation, various techniques to verify such nodes can be performed. At block 430 an EM safety tree may be generated and an appropriate safety level within the tree for each IoT device may be selected, e.g., based on configured policies, and this level is provided to the IoT device(s). Note that the time-based encoding via the EM tree is used when deriving symmetric keys used to encrypt device state synchronization messages. A new key may be derived every day, hour, minute, etc. Since both the device and safety controller share the same tree, they can agree on which seed to use to derive the next key. As such, a communication may be sent to each IoT device to identify a particular safety level update to take effect, in cases in which there are multiple possible safety levels (e.g., low, medium, high).

Still with reference to FIG. 4, next at block 440 individual/reporting nodes that that assert and acknowledge the safety alert can be verified. In one embodiment, this acknowledgement may take the form of a response received from the given individual/reporting node. This response, in embodiments, may be encrypted with a given EM PRNG seed value. Such verification and acknowledgement of multiple individual/reporting nodes can occur. In an embodiment, based on policy configuration the safety controller can wait for a threshold number of such nodes to verify and acknowledge the request, e.g., M of N nodes (block 450). Next at block 460 after this threshold is met, the safety state of the IoT devices can be transitioned back to an operational mode. Note that if a safety issue is still active, the safety controller may still detect the alert and take further policy-based actions which may include forcing all device to continue to be in a safety critical state, and/or generating alerts for an administrator console to take further action.

In an embodiment, the safety controller can send a broadcast message to indicate this safety state transition. Note that for reporting information from the individual/reporting nodes to the safety controller, reporting nodes, such as device controllers may aggregate individual reporting nodes data from the distributed shared memory, and communicate such aggregate reports to a higher hierarchy level, e.g., a given zone/safety controller of a higher hierarchy within a system architecture. Understand while shown at this high level in the embodiment of FIG. 4, many variations and alternatives are possible.

Figure 5:
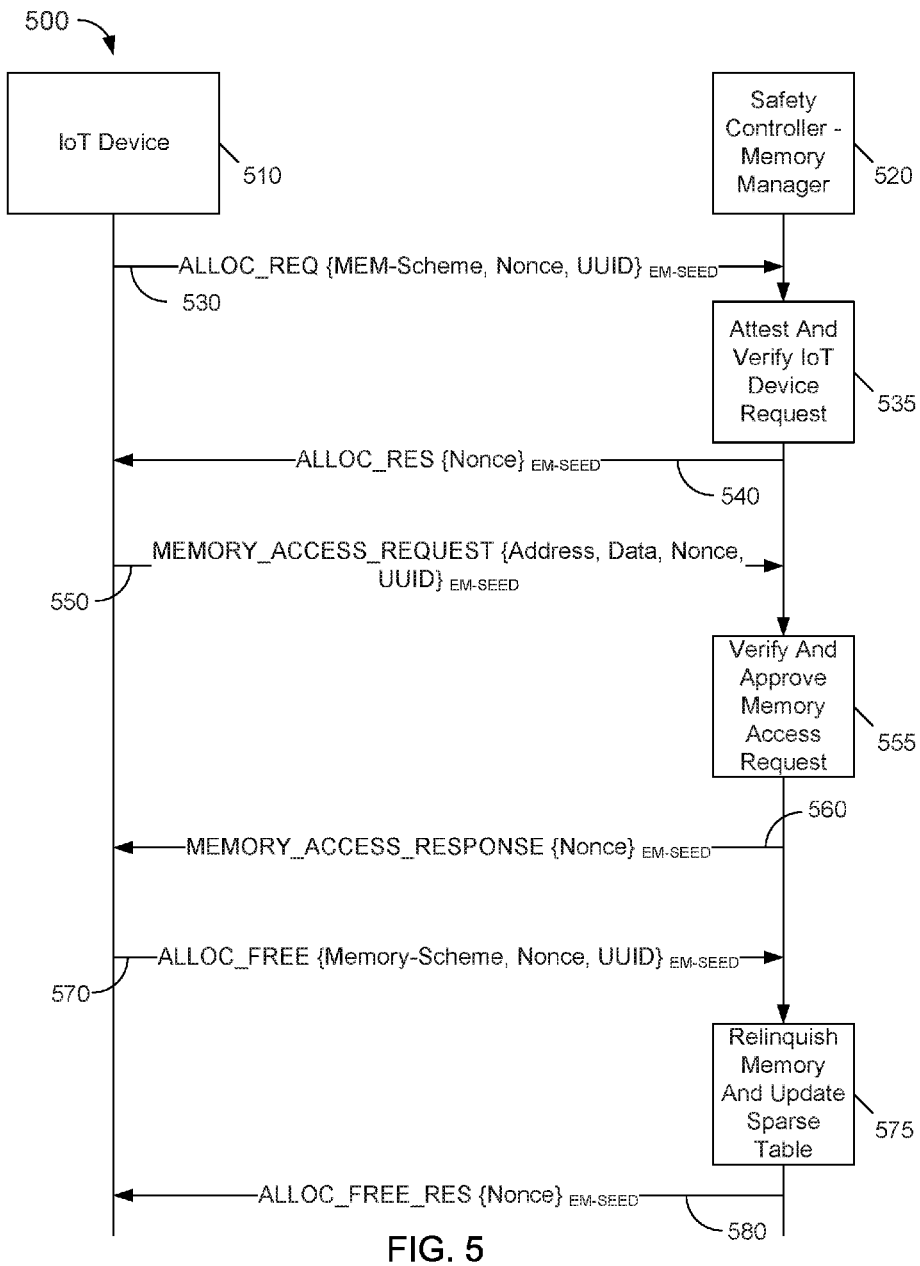
FIG. 5 is a flow diagram of a memory management method in accordance with an embodiment of the present invention.

Referring now to FIG. 5, shown is a flow diagram of a memory management method in accordance with an embodiment of the present invention. More specifically, method 500 shown in FIG. 5 may be performed at least in part by logic of a safety controller, such as a memory manager logic, to avoid collisions within the distributed shared memory structure, which in an embodiment may be a sparse table.

As illustrated, assume presence of an IoT device 510 coupled via a network to a safety controller 520 that includes a memory manager logic. Operation may begin by receiving a request 530 from IoT device 510. More specifically, this request is an allocation request of the form: ALLOC_REQ [mem-scheme, nonce, UUID]$_{EM\text{-}SEED}$. Note that safety controller 520 can approve/deny a requested allocation offset or read/write requests, so that IoT device 510 tries again with a different (e.g., 512-bit) random number. Or more generally, responsive to a denial, IoT device 510 may perform a given policy-based action. For example, IoT device 510 can re-try the request or may exclude itself from safety critical state operations if determined by the safety controller. Responsive to receipt of this request, safety controller 520 may attest and verify this request (block 535).

Responsive to successful attestation and verification, safety controller 520 generates and sends an allocation response 540 including a nonce to IoT device 510, which in an embodiment may be of the form: ALLOC_RES {nonce}$_{EM\text{-}Seed}$. Next, IoT device 510 issues a memory access request (block 550). In an embodiment, this access request may be of the form: MEMORY_ACCESS_REQUEST {address, data, nonce, UUID}$_{EM\text{-}SEED}$, which may correspond to a write request to write data to a given address. Next at block 555 safety controller 520 may verify the request, and if verified, approve the memory access request. As such, at block 560 a response is sent, which may be an acknowledgement of the write operation, and which may take the form of: MEMORY_ACCESS_RESPONSE {nonce}$_{EM\text{-}SEED}$. Thereafter, IoT device 510 may issue a request 525 to relinquish the space. In an embodiment this request may take the form of: ALLOC_FREE {memscheme, nonce, UUID}$_{EM\text{-}SEED}$. Responsive to receipt of this allocation request, safety controller 520 may relinquish the memory and update the sparse table accordingly (block 575). Finally, at state 580 safety controller 520 may send a response to IoT device 510 to indicate the freeing of this memory range, which in an embodiment may take the form: ALLOC_FREE_RES {nonce}$_{EM\text{-}SEED}$. Understand while shown with this particular implementation in FIG. 5, many variations and alternatives are possible.

Figure 6:
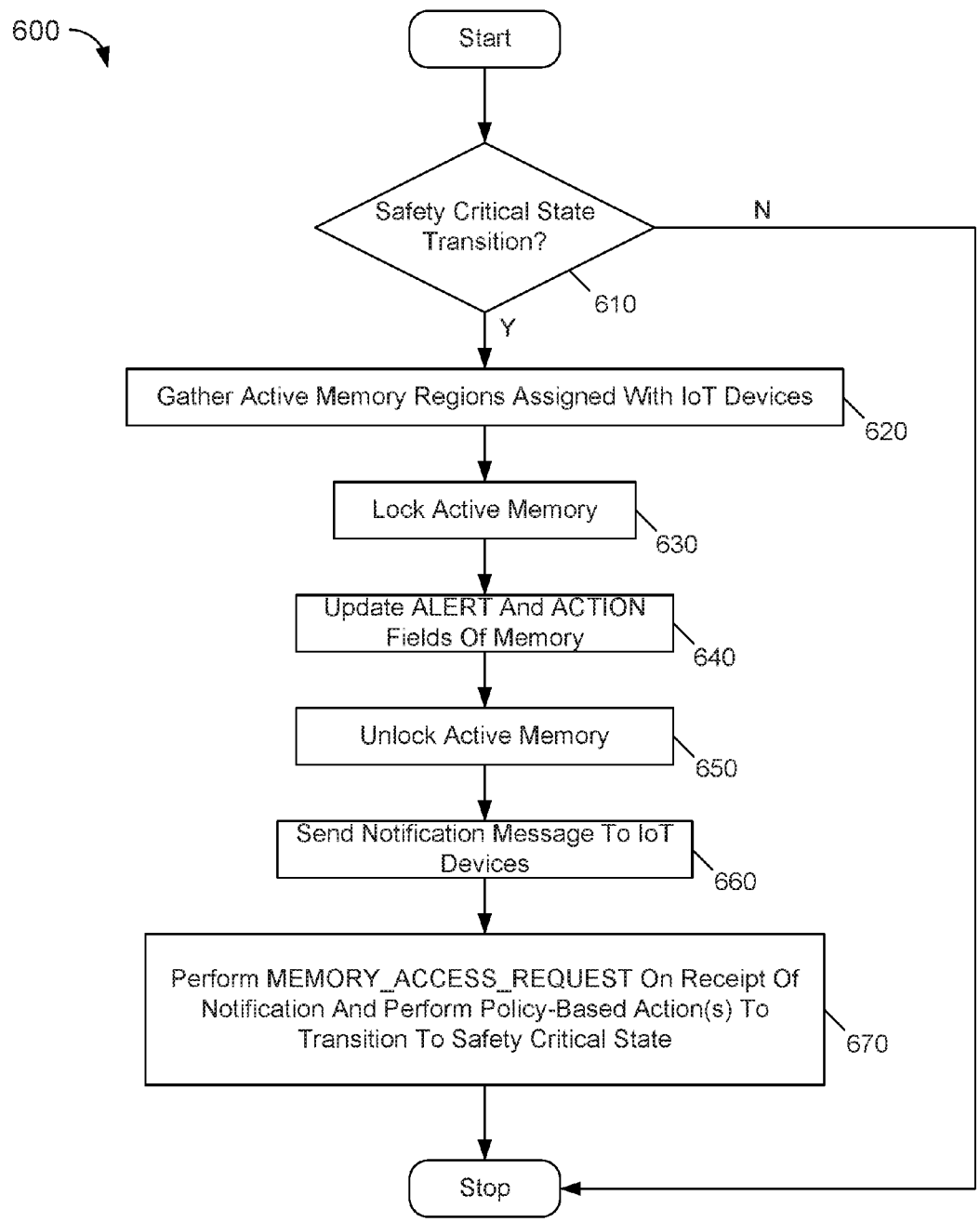
FIG. 6 is a flow diagram of a method for IoT state transitions in accordance with an embodiment.

With reference now to FIG. 6, shown is a flow diagram of a method for IoT state transitions in accordance with an embodiment. Method 600 may be performed by a safety controller configured as described herein. As shown in FIG. 6, a transition from safe state to safety critical state occurs. A similar flow (not shown) is applicable for transitioning devices back to a safe state. In an embodiment, a safety controller can maintain a list of active assigned regions that it can lock and perform a write operation for a new state to which devices are expected to transition. The update may trigger a notification message to the IoT devices. In turn, the IoT devices may perform a memory access (e.g., READ, . . . ) operation and transition appropriately. In some cases, the trigger can be delivered as a multi-cast transmission, e.g., when there are a threshold number of IoT devices having state changed, e.g., to a Safe mode.

In an embodiment, ALERTS and associated ACTIONS can be propagated from a special EM safety tree level that is agreed between safety controller and IoT devices. Transactional memory managed via EM helps in efficient state tracking. Note that devices can be enabled to perform fountain code alerts on state transitions, such that a first message sets a transaction state and subsequent messages can be ignored.

Responsive to determining that a safety critical state transition is indicated (at diamond 610), control passes to block 620. At block 620 active memory regions assigned with IoT devices may be gathered. In one embodiment, a scatter gather list may be used to aggregate the safety mode data allocated for all the N IoT devices in the sparse memory. This may involve applying synchronization primitives such as LOCK/UNLOCK to avoid any race condition between the safety controller and the individual nodes accessing the same memory location. As an example, this active memory may correspond to a set of memory locations within a distributed shared memory structure, e.g., [$M_{IoT1}$, $M_{IoT2}$, . . . $M_{IoTn}$]. Next at block 630 the active memory may be locked. In an embodiment, a lock indicator may be set to indicate locking of the memory. Next the fields of the active memory may be updated. Namely alert and action fields may be updated to transition to a safety critical state (block 640). Thereafter, at block 650 the active memory may be unlocked.

Still with reference to FIG. 6, next at block 660 a notification message may be sent to other devices, e.g., responsive to the update to the locked memory. This notification message thus provides a notice regarding the update to the shared memory structure. In one embodiment, a Gossip or similar protocol may be used to enable a notification of one or more nearest neighbors that in turn communicate such notification messages onward through a network. Finally, at block 670, an IoT device may perform a memory access request on receipt of a notification. Thereafter, the device may perform given policy-based actions to transition to a safety critical state. As an example, actuators such as door actuators or window actuators may be opened to enable opening of such doors or windows, e.g., due to a fire-related safety condition. Understand while shown at this high level in FIG. 6, many variations and alternatives are possible.

Thus in various embodiments, an external safety controller for an IoT network may manage safety state transitions of IoT devices in a secure manner, via a shared sparse transactional memory region. Such IoT devices may enter and exit safety critical states by synchronizing their local memory state with this shared memory region. To this end, an EM technique may be used to distribute a time-based EM safety seed tree, which may be used for deriving symmetric encryption keys, and in turn may be used to protect memory synchronization messages, including messages communicating safety state updates.

In various embodiments, IoT devices and a safety controller can communicate securely for alerts and associated actions via the shared memory, with data encrypted using EM-generated keys. By way of unique memory region assignment via EM techniques, multiple IoT devices can concurrently access the shared memory without proceeding through critical section lock acquisitions. As such, a safety controller and IoT devices can work in synergy for memory management (e.g., allocation, free, read and write operations), and to avoid collisions.

Figure 7:
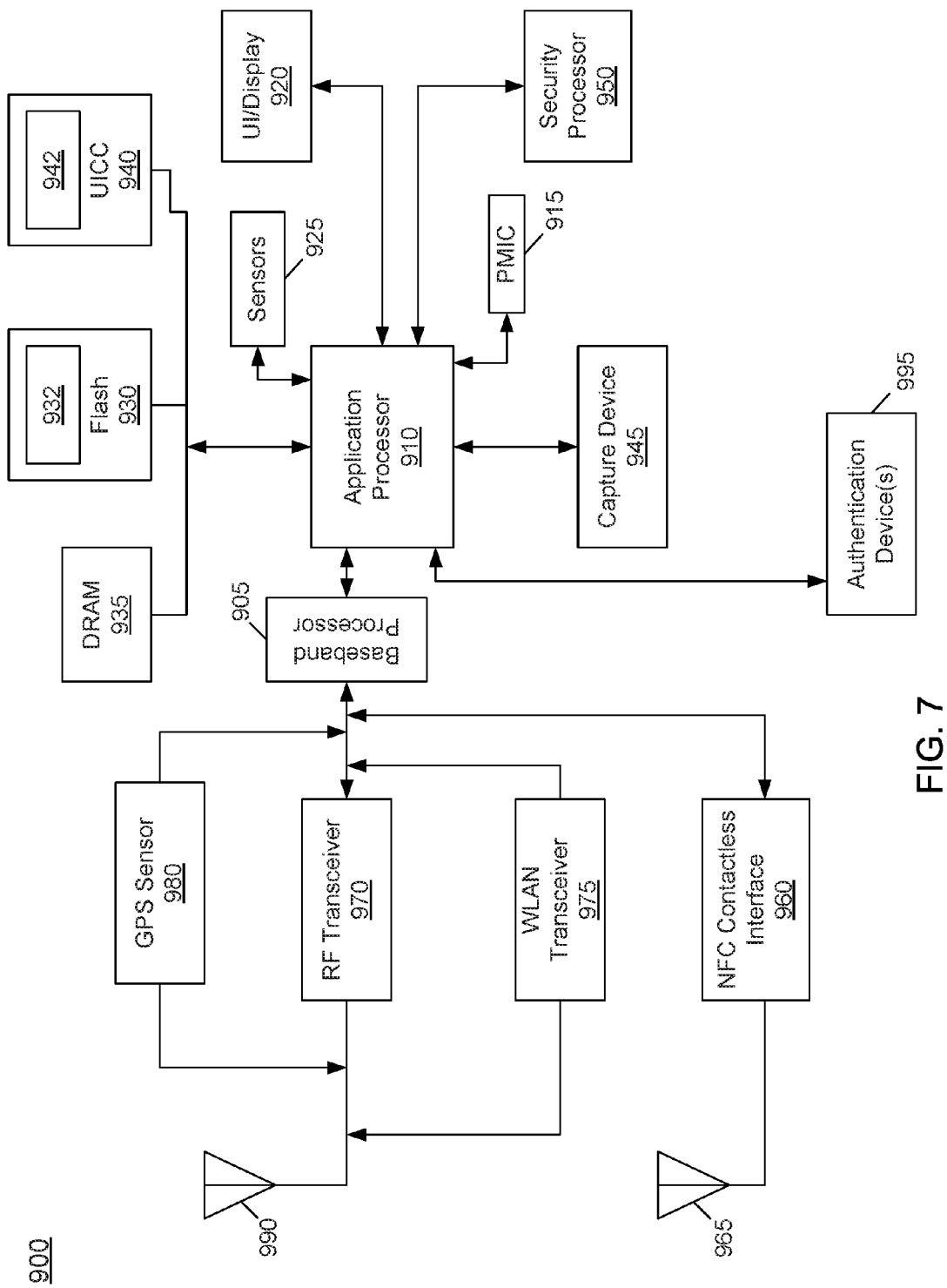
FIG. 7 is a block diagram of an example system with which embodiments can be used.

Referring now to FIG. 7, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935.

In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 7, a universal integrated circuit card (UICC) 940 comprises a subscriber identity module, which in some embodiments includes a secure storage 942 to store secure user information. System 900 may further include a security processor 950 that may that may implement a trusted execution environment (TEE), and which may couple to application processor 910. Furthermore, application processor 910 may implement a secure mode of operation, such as Intel® Software Guard Extensions (SGX) to a given instruction set architecture, and circuitry for hosting of a TEE. A plurality of sensors 925, including one or more multi-axis accelerometers may couple to application processor 910 to enable input of a variety of sensed information such as motion and other environmental information, including safety-related information as described herein. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 7, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 8:
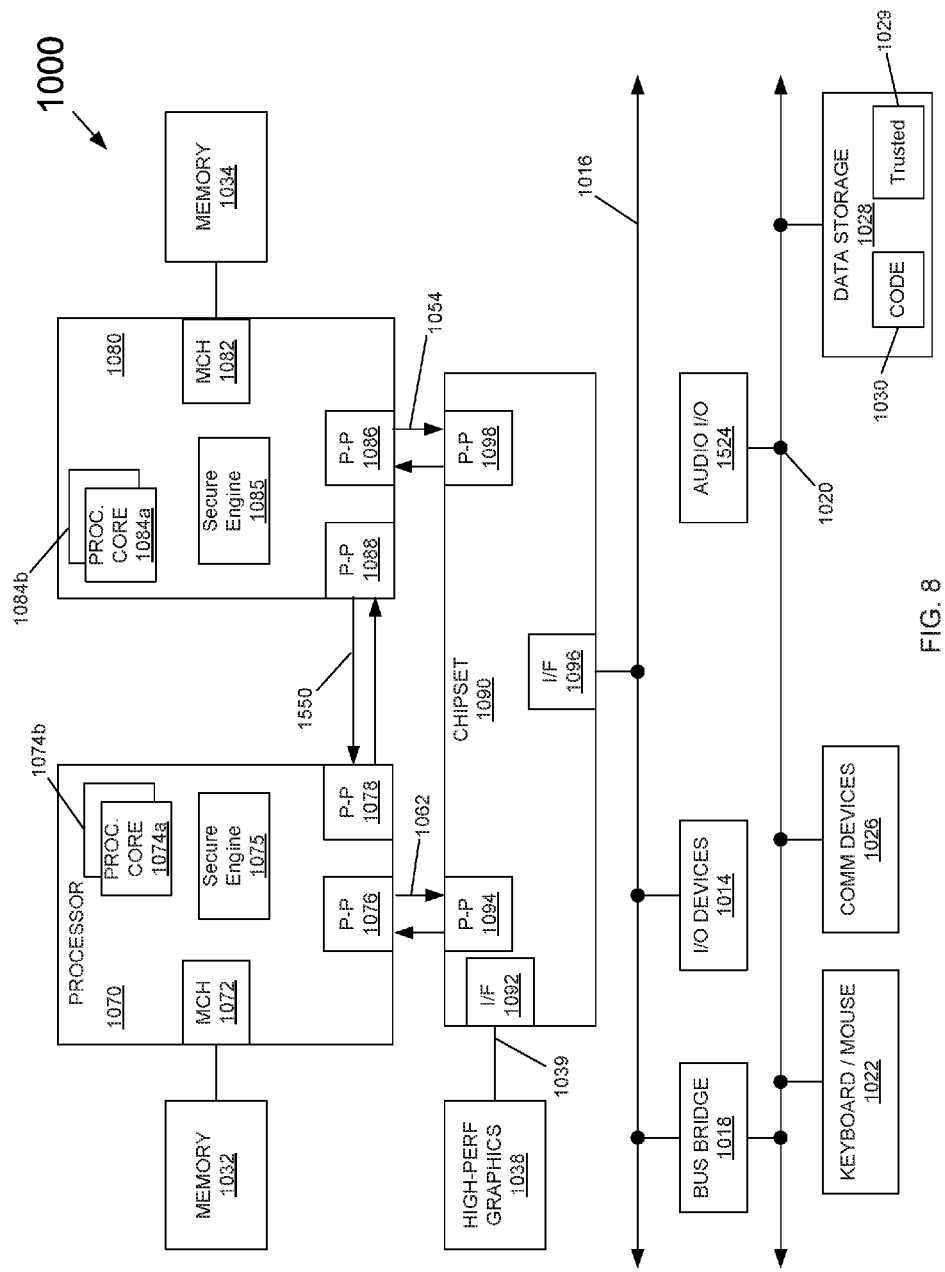
FIG. 8 is a block diagram of a system in accordance with another embodiment of the present invention.

Referring now to FIG. 8, shown is a block diagram of a system in accordance with another embodiment of the present invention. As shown in FIG. 8, multiprocessor system 1000 is a point-to-point interconnect system such as a server system, and includes a first processor 1070 and a second processor 1080 coupled via a point-to-point interconnect 1050. As shown in FIG. 8, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as key management, attestations, IoT network onboarding and the distributed safety state management described herein, or so forth.

Still referring to FIG. 8, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 8, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 8, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 8, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 9:
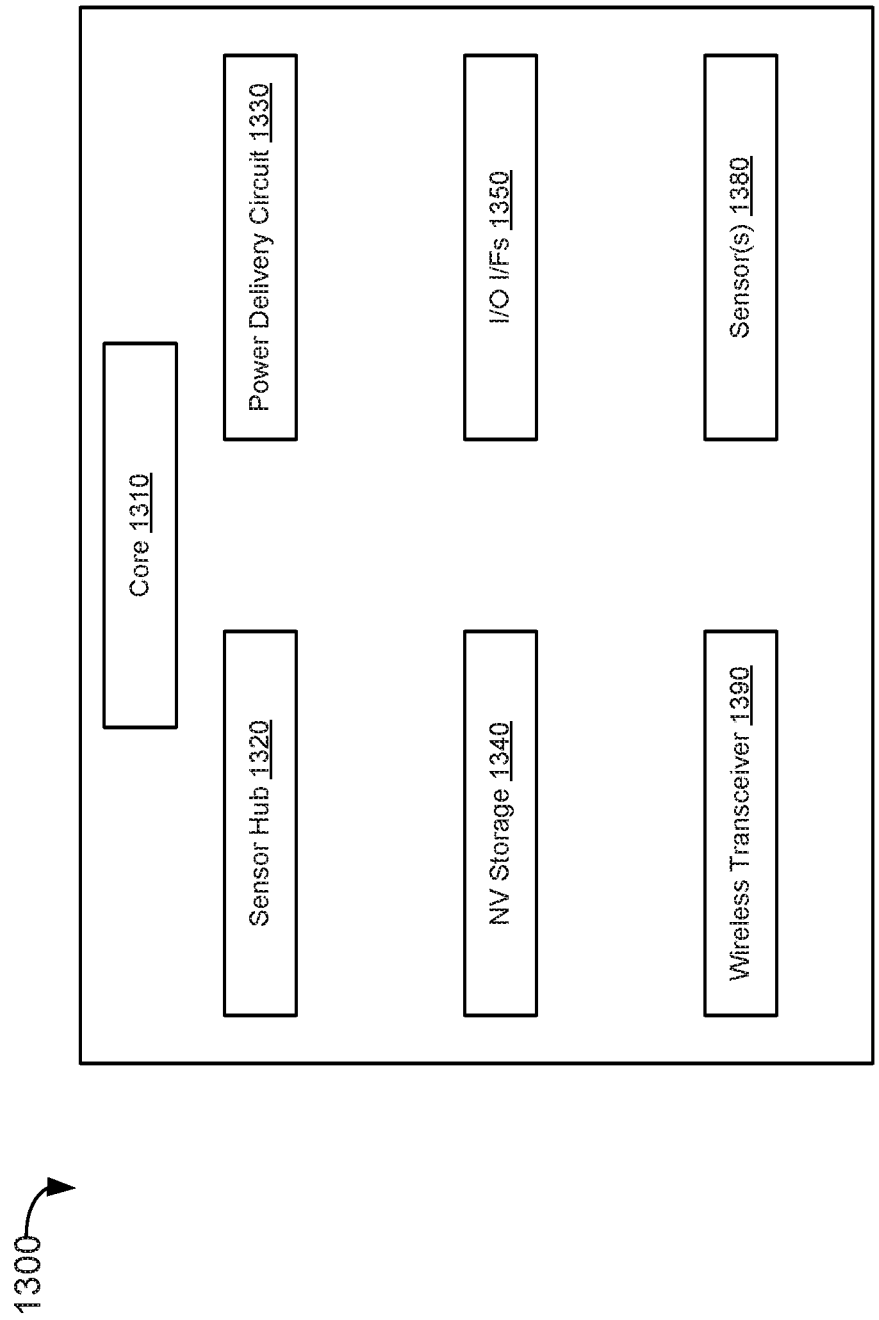
FIG. 9 is a block diagram of a wearable module in accordance with another embodiment.

Embodiments may be used in environments where IoT devices may include wearable devices or other small form factor IoT devices. Referring now to FIG. 9, shown is a block diagram of a wearable module 1300 in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I2C/GPIO protocols, may be present. In addition, a wireless transceiver 1390, which may be a Bluetooth™ low energy or other short-range wireless transceiver is present to enable wireless communications as described herein. Understand that in different implementations a wearable module or other small form factor IoT device can take many other forms.

The following Examples pertain to further embodiments.

In Example 1, a device comprises: at least one processor; at least one sensor to sense an environmental condition; and a storage to store instructions that, when executed by the at least one processor, enable the device to: receive an encrypted nonce from a safety controller, the safety controller coupled to the device via an IoT network; decrypt the encrypted nonce using a value obtained from an entropy multiplexing seed tree generated by the device based at least in part on an initialization seed value received from the safety controller; responsive to decryption of the nonce, update a portion of a shared memory associated with the device to identify a safety state of the device; and encrypt a second nonce using the value obtained from the entropy multiplexing seed tree and send the encrypted second nonce to the safety controller.

In Example 2, the shared memory comprises a distributed sparse shared memory.

In Example 3, the device of one or more of the above Examples further comprises instructions that when executed enable the device to obtain the safety state from a local memory of the device, where the update to the shared memory is to synchronize the distributed sparse shared memory with the local memory.

In Example 4, the device of one or more of the above Examples further comprises instructions that when executed enable the device to generate the entropy multiplexing seed tree based at least in part on the initialization seed value, the entropy multiplexing seed tree to encode time and memory segmentation of the shared memory.

In Example 5, the device of one or more of the above Examples further comprises instructions that when executed enable the device to encrypt the safety state of the device before communication of the update to the portion of the shared memory.

In Example 6, the device of one or more of the above Examples further comprises instructions that when executed enable the device to determine a location of the portion of the shared memory based on a universally unique identifier of the device and a random value obtained from the entropy multiplexing seed tree, where the random value obtained from the entropy multiplexing seed tree comprises a symmetric encryption key.

In Example 7, the update to the portion of the shared memory comprises a communication of the safety state to at least one other IoT device in the IoT network, to enable the at least one other IoT device to send a report to the safety controller, the report including the safety state, where the safety state is encrypted with a value obtained from the entropy multiplexing seed tree.

In Example 8, the device of one or more of the above Examples further comprises instructions that when executed enable the device to send a memory allocation request for the portion of the shared memory to the safety controller, the memory allocation request including memory property metadata, a third nonce, and a universally unique identifier of the device.

In Example 9, the device of Example 8 further comprises instructions that when executed enable the device to receive an allocation response from the safety controller, the allocation response including the location of the portion of the shared memory, the location based at least in part on the universally unique identifier of the device.

In Example 10, the device of Example 8 further comprises instructions that when executed enable the device, responsive to denial of the memory allocation request by the safety controller, to perform a policy-based action.

In Example 11, the device further comprises at least one actuator to take an action responsive to a transition in the safety state of the device, where the device is to receive an indication of the transition from the safety controller.

In Example 12, a method comprises: receiving, in a safety controller coupled to a first network including a plurality of nodes, a plurality of attestation values and a plurality of safety reports from a plurality of reporting nodes of the first network, each of the plurality of attestation values randomly generated in the corresponding reporting node based on a common random seed value; determining whether at least a threshold number of the plurality of attestation values are valid; responsive to at least the threshold number of the plurality of attestation values being valid, decrypting the plurality of safety reports and process the decrypted plurality of safety reports to obtain aggregated safety data of the plurality of nodes; and updating a distributed sparse shared memory coupled to the safety controller, based at least in part on the aggregated safety data.

In Example 13, the method further comprises updating the distributed sparse shared memory by storage of safety state information of a first node of the plurality of nodes into a first predetermined location of the distributed sparse shared memory associated with the first node.

In Example 14, the method further comprises providing an initialization seed value to the first network, to enable the initialization seed value to be distributed to the plurality of nodes, to enable the plurality of nodes to generate an entropy multiplexing safety seed tree.

In Example 15, the method further comprises decrypting a first portion of the aggregated safety data associated with a first node using a decryption key obtained from the entropy multiplexing safety seed tree of the safety controller.

In Example 16, the plurality of nodes comprises IoT devices, where the first network comprises an IoT network.

In Example 17, the method comprises entering a trusted execution environment to receive the plurality of safety reports and determining whether at least the threshold number of the plurality of attestation values comprises a common $g^a$ value.

In Example 18, a method comprises: receiving, in a safety controller coupled to a first network including a plurality of nodes, a plurality of attestation values and a plurality of safety reports from a plurality of reporting nodes of the first network, each of the plurality of attestation values randomly generated in the corresponding reporting node based on a common random seed value; determining whether at least a threshold number of the plurality of attestation values are valid; responsive to at least the threshold number of the plurality of attestation values being valid, decrypting the plurality of safety reports and processing the decrypted plurality of safety reports to obtain aggregated safety data of the plurality of nodes; and updating a distributed sparse shared memory coupled to the safety controller, based at least in part on the aggregated safety data.

In Example 19, the method further comprises storing safety state information of a first node of the plurality of nodes into a first predetermined location of the distributed sparse shared memory associated with the first node.

In Example 20, the method further comprises: providing an initialization seed value to the first network, to enable the initialization seed value to be distributed to the plurality of nodes, to enable the plurality of nodes to generate an entropy multiplexing safety seed tree; and decrypting a first portion of the aggregated safety data associated with a first node using a decryption key obtained from the entropy multiplexing safety seed tree of the safety controller.

In Example 21, the method further comprises: entering a trusted execution environment to receive the plurality of safety reports; and determining whether at least the threshold number of the plurality of attestation values comprises a common $g^a$ value.

In Example 22, a device comprises: means for receiving an encrypted nonce from a safety controller, the safety controller coupled to the device via an IoT network; means for decrypting the encrypted nonce using a value obtained from an entropy multiplexing seed tree generated by the device based at least in part on an initialization seed value received from the safety controller; means for updating a portion of a shared memory associated with the device to identify a safety state of the device; and means for encrypting a second nonce using the value obtained from the entropy multiplexing seed tree and sending the encrypted second nonce to the safety controller.

In Example 23, the device further comprises means for obtaining the safety state from a local memory of the device, including means for synchronizing the distributed sparse shared memory with the local memory.

In Example 24, the device further comprises means for generating the entropy multiplexing seed tree based at least in part on the initialization seed value, the entropy multiplexing seed tree to encode time and memory segmentation of the shared memory.

In Example 25, the device further comprises means for encrypting the safety state of the device before communication of the update to the portion of the shared memory.

In another example, a computer readable medium including instructions is to perform the method of any of the above Examples.

In another example, a computer readable medium including data is to be used by at least one machine to fabricate at least one integrated circuit to perform the method of any one of the above Examples.

In another example, an apparatus comprises means for performing the method of any one of the above Examples.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a system to:
provide an initialization seed value to a first network including a plurality of nodes for distribution to the plurality of nodes, for use in the plurality of nodes to generate an entropy multiplexing safety seed tree in the plurality of nodes, the entropy multiplexing safety seed tree to encode a time and a segmentation of a distributed sparse shared memory comprising a transactional memory, wherein each of the plurality of nodes includes a local memory to be mapped and synchronized to a unique region of the distributed sparse shared memory;
receive, in a safety controller coupled to the first network, a plurality of attestation values and a plurality of safety reports from a plurality of reporting nodes of the first network, each of the plurality of attestation values randomly generated in the corresponding reporting node using the entropy multiplexing safety seed tree based on the initialization seed value received from the safety controller;
determine whether at least a threshold number of the plurality of attestation values are a same value comprising a common $g^a$ value;
responsive to at least the threshold number of the plurality of attestation values being the same value, decrypt the plurality of safety reports using a corresponding decryption key for each node obtained from the entropy multiplexing safety seed tree and process the decrypted plurality of safety reports to obtain aggregated safety data of the plurality of nodes; and
update the distributed sparse shared memory coupled to the safety controller, based at least in part on the aggregated safety data.

2. The at least one non-transitory computer readable storage medium of claim 1, further comprising instructions that when executed enable the system to update the distributed sparse shared memory by storage of safety state information of a first node of the plurality of nodes into a first predetermined location of the distributed sparse shared memory associated with the first node.

3. The at least one non-transitory computer readable storage medium of claim 1, further comprising instructions that when executed enable the system to decrypt a first portion of the aggregated safety data associated with a first node using a first decryption key obtained from the entropy multiplexing safety seed tree of the safety controller.

4. The at least one non-transitory computer readable storage medium of claim 1, wherein the plurality of nodes comprises Internet of Things (IoT) devices, wherein the first network comprises an IoT network.

5. A method comprising:
providing an initialization seed value to a first network including a plurality of nodes for distribution to the plurality of nodes, for use in the plurality of nodes to generate an entropy multiplexing safety seed tree in the plurality of nodes, the entropy multiplexing safety seed tree to encode a time and a segmentation of a distributed sparse shared memory comprising a transactional memory, wherein each of the plurality of nodes includes a local memory to be mapped and synchronized to a unique region of the distributed sparse shared memory;
receiving, in a safety controller coupled to the first network, a plurality of attestation values and a plurality of safety reports from a plurality of reporting nodes of the first network, each of the plurality of attestation values randomly generated in the corresponding reporting node using the entropy multiplexing safety seed tree based on the initialization seed value received from the safety controller;
determining whether at least a threshold number of the plurality of attestation values are a same value comprising a common $g^a$ value;
responsive to at least the threshold number of the plurality of attestation values being the same value, decrypting the plurality of safety reports using a corresponding decryption key for each node obtained from the entropy multiplexing safety seed tree and processing the decrypted plurality of safety reports to obtain aggregated safety data of the plurality of nodes; and
updating the distributed sparse shared memory coupled to the safety controller, based at least in part on the aggregated safety data.

6. The method of claim 5, further comprising storing safety state information of a first node of the plurality of nodes into a first predetermined location of the distributed sparse shared memory associated with the first node.

7. The method of claim 5, further comprising:
decrypting a first portion of the aggregated safety data associated with a first node using a first decryption key obtained from the entropy multiplexing safety seed tree of the safety controller.

8. The method of claim 5, further comprising:
entering a trusted execution environment to receive the plurality of safety reports; and determining whether at least the threshold number of the plurality of attestation values comprises the common $g^a$ value.

* * * * *